3,278,559
VINYLIDENE-BEARING 1,5-EPOXYHEXA-METHYLENE DIOXY COMPOUNDS

Heinz F. Reinhardt, Wilmington, Del., assignor to E. I. du Pont de Nemours and Company, Wilmington, Del., a corporation of Delaware
No Drawing. Filed July 2, 1962, Ser. No. 207,054
4 Claims. (Cl. 260—345.8)

This invention relates to a new class of organic compounds containing at least one 1,5-epoxyhexamethylenedioxy radical or 2,5-dimethyl-1,5-epoxyhexamethylenedioxy radical. It in particular relates to a new class of polymerizable 1,5-epoxyhexamethylenedioxy and 2,5-dimethyl-1,5-exoxyhexamethylenedioxy compounds containing at least one vinylidene group.

The compounds of this invention are represented by the structural formula:

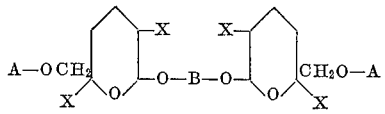

in which:

X is hydrogen or methyl;
A is $C_3$–$C_4 \alpha,\beta$-alkenoyl;
B represents one of the following polymethylene radicals: divinylethylene, $C_2$–$C_{10}$ polymethylene.

This class of compounds is prepared by the addition of mono or di hydroxy compounds to the unsaturated bond of a 3,4-dihydropyran methanol ester. Preferably, this reaction is carried out under substantially anhydrous conditions and in the presence of a small amount of acidic material. A temperature range of 0° to 75° C. is desirable. Inert solvents can also be present and when used, stripping of the solvent at reduced pressure affords a convenient means to recover the addition product. The starting pyran esters in turn are derived by the esterification of the product made by condensation (cyclic dimerization), and subsequent reduction of acrolein and/or methacrolein, as is described, for example, in U.S. 2,479,283, Whetstone, August 16, 1959, and U.S. 2,537,921, Smith et al., January 9, 1951.

The vinylidene-bearing 1,5-epoxyhexamethylenedioxy and 2,5 - dimethyl - 1,5 - epoxyhexamethylenedioxy compounds of this invention provide a unique class of monomers polymerizable to both thermoplastic as well as to thermosetting or crosslinkable polymers. The presence of the 1,5-epoxyhexamethylenedioxy structure (abbreviated EHDO) affords some unique properties not readily obtainable otherwise:

(a) This EHDO structure in combination with a vinylidene group permits preparation of monomers for protective and decorative coating compositions which at room temperature are polymerizable and air dry in the presence of cobalt and related siccative metal compounds.

(b) Where compounds have in addition at least two vinylidene groups, it is possible to photopolymerize them to solid gels or films useful as photo-resists and printing plates in the graphic arts industry.

(c) This EHDO structure acts as a site for promoting adhesion of coating polymers to various substrates, such as metals, glass, wood, plastics, leather, textiles, etc.

Many of these compounds, and especially those with only one or no vinylidene group can, in addition, be used effectively as plasticizers for cellulosic and vinyl type polymer compositions.

The classes of compounds illustrated by the structural formulas shown above can be delineated by consideration of their following substituents.

The $C_3$–$C_4 \alpha,\beta$-alkenoyl groups include acryloyl, methacryloyl and α-chloroacryloyl. Acryloyl and methacryloyl are preferred.

The radicals of the B category are divinylethylene and $C_2$–$C_{10}$ polymethylene, including ethylene, trimethylene, tetramethylene, pentamethylene, hexamethylene, octamethylene and decamethylene. They are the residues corresponding to those remaining after removing the hydroxyl groups from the respective diols.

The radicals of the X category are hydrogen or methyl and thus provide the structures resulting from the cyclic dimerization of acrolein, methacrolein or a mixture of acrolein/methacrolein.

Example I

To a three-necked flask fitted with thermometer, dropping funnel, reflux condenser and stirrer are charged, under a blanket of nitrogen, 23.1 parts (0.075 mol) of di-3,4-dihydropyran-2-methyl fumarate and 32.1 parts (0.15 mol) of trimethylolpropane diallyl ether containing a few bubbles of anhydrous HCl gas. The temperature rises to 35° C. and stirring is continued for about 4 hours. The colorless viscous product is then cooled to below 20° C., extracted by shaking vigorously with several successive portions of aqueous 5% NaOH solution and dried. It is identified as the fumarate bis ester of 6[di(allyloxymethyl)butoxy]tetrahydropyran-2-methanol.

Addition of 0.0025 part of cobalt (as cobalt butyl phthalate solution in acetone) to 5 parts of the above product and coating the composition as a 1.5 mil film on glass and Bonderited steel panels yield a clear, tack-free coating after 36 hours' air drying. Baking of other panels of these films at 100° C. for 30 minutes yields a hard, colorless, insoluble coating.

An analogous ester of the above example is prepared by replacing the 32.1 parts (0.15 mol) of trimethylolpropane diallyl ether with 8.7 parts (0.15 mol) of allyl alcohol, producing the fumarate bis ester of 6-allyloxytetrahydropyran-2-methanol, or with 10.8 parts (0.15 mol) of methallyl alcohol to form the fumarate bis ester of 6-methallyloxytetrahydropyran-2-methanol.

Example II

Using the equipment of Example I in which are charged 62 parts (0.35 mol of 3,4-dihydropyran-2-methyl methacrylate, 19.87 parts (0.175 mol) of ethylene glycol with a trace of dry HCl gas added slowly with stirring over a period of 15 minutes. The temperature is maintained below 64° C. by cooling where necessary and stirring continued for 1.5 hours. The reaction mixture is cooled, diluted with about 20 parts of diethyl ether and then extracted with 75 parts of 5% aqueous NaOH solution. The mixture is then washed and extracted with several successive portions of distilled water, separated and dried over anhydrous sodium sulfate. The product is filtered and the ether evaporated by blowing with nitrogen to leave a colorless, viscous product identified as 6,6'-ethylenedioxy-bis-tetrahydropyran-2-methyl methacrylate).

Films containing 0.05% cobalt as in Example I are then prepared and found to air dry overnight to a transparent, glossy, tack-free surface. Further baking at 120° C. for 30 minutes enhances the hardness and renders the film insensitive to tetrahydrofuran, toluene and acetone.

In an analogous manner, 6,6'-(ethylenedioxy)bis(tetrahydropyran-2-methyl acrylate) is made by replacing the 62.0 parts (0.35 mol) of 3,4-dihydropyran-2-methyl methacrylate by 58.8 parts of 3,4-dihydropyran-2-methylacrylate in the above reaction.

Still further in an analogous manner, 6,6'(hexamethylenedioxy)bis(tetrahydropyran-2-methyl acrylate) and 6,6'(hexamethylenedioxy)bis(tetrahydropyran - 2 - methyl methacrylate) are prepared by replacing the 10.87 parts (0.175 mol) of ethylene glycol by about 20.7 parts (0.175 mol) of hexamethylene glycol in the two reactions directly above.

*Example III*

Using the equipment of Example I, 67.2 parts (0.4 mol) of 3,4-dihydropyran-2-methyl acrylate containing a trace of dry HCl gas are reacted with 21.6 parts (0.19 mol) of 1,2-divinylethylene glycol by adding the latter slowly and maintaining the reaction temperature below 25° C. for several hours by cooling when necessary. Three parts of anhydrous potassium carbonate are stirred in for 10 minutes, then the mixture is filtered. The product can alternatively, as in Example II, be vigorously shaken with 5% aqueous caustic washed, separated and dried to remove the traces of acidity. The product is a clear viscous liquid: 6,6′(1,2 - divinylethylenedioxy)bis(tetrahydropyran-2-methyl acrylate).

Mixing of the ester with 0.05% cobalt as in Example II, produces a coating composition that air dries in 24 hours to a clear, tack-free film. Exposure of a thin film of this ester prepared with 0.5% of 2-ethylanthraquinone and 0.4% of p-methoxyphenol to a 125 watt Hanonia ultraviolet lamp at 1.5 inches distance produced photopolymerization to a solid gel in about 20 seconds.

*Example IV*

Using the technique of Example II, 145.6 parts (0.8 mol) of 3,4-dihydropyran-2-methyl methacrylate are reacted with 45.6 parts (0.4 mol) of divinylethylene glycol, keeping the temperature of the reaction below 43° C. and continuing stirring for about 17 hours. The product is then stripped of residual acidity by caustic treatment and dried as in Example II. A colorless liquid residue remains, with a viscosity of 0.5 poise and is identified by analysis:

Calc.: 65.25 C, 8.00 H.
Found: 65.60 C, 8.12 H.

as 6,6′(1,2 - divinylethylenedioxy)bis(tetrahydropyran-2-methyl methacrylate).

A mixture of this ester with 0.4% of 2-ethylanthraquinone and 0.4% of p-methoxyphenol is coated as a 3 mil thick film on glass and aluminum. On exposure to a 125 watt Hanonia ultraviolet lamp located 1.5 inches away for about 55 seconds, this coating is photo-polymerized to a solid gel.

*Example V*

Using the technique and equipment of Example I, related bis esters are prepared by reacting the appropriate pyranyl ester with an alcohol, as follows:

(a) 24.1 parts (0.075 mol) of di-3,4-hydropyran-2-methyl itaconate replace the 23.1 parts of the di-3,4-dihydropyran-2-methyl fumarate in Example I to react respectively with 32.1 parts (0.15 mol) of trimethylolpropane diallyl ether or 8.7 parts (0.15 mol) of allyl alcohol or 10.8 parts (0.15 mol) of methallyl alcohol to form respectively the:

Itaconate bis ester of 6 di(allyloxymethyl)butoxy tetrahydropyran-2-methanol,
Itaconate bis ester of 6-allyloxytetrahydropyran-2-methanol,
Itaconate bis ester of 6-methallyloxytetrahydropyran-2-methanol.

(b) 26.8 parts (0.075 mol) of di-3,4-dihydropyran-2-methyl phthalate are reacted with 8.7 parts (0.15 mol) of allyl alcohol to form the phthalate bis ester of 6-allyloxy-tetrahydropyran-2-methanol.

(c) 25.3 parts (0.075 mol) of the adipate bis ester of 3,4-dihydropyran-2-methanol are reacted with 8.7 parts (0.15 mol) of allyl alcohol to form the adipate bis ester of 6-allyloxytetrahydropyran-2-methanol.

(d) 29.5 parts (0.075 mol) of the sebacate bis ester of 3,4-dihydropyran-2-methanol are reacted with 8.7 parts (0.15 mol) of allyl alcohol to form the sebacate bis ester of 6-allyloxytetrahydropyran-2-methanol.

I claim:
1. A vinylidene-bearing 1,5-epoxyhexamethylene compound represented by the formula

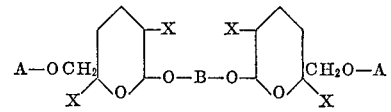

where
A is $C_3$–$C_4\alpha,\beta$-alkenoyl;
B is a divalent radical selected from the class consisting of divinylethylene, and $C_2$–$C_{10}$ polymethylene; and
X is selected from the class consisting of hydrogen and methyl.

2. The compounds of claim 1 in which A is $C_3$–$C_4\alpha,\beta$-alkenoyl, B is $C_2$–$C_{10}$ polymethylene.

3. The compounds of claim 1 in which A is $C_3$–$C_4\alpha,\beta$-alkenoyl, B is divinylethylene.

4. 6,6′(1,2 - divinylethylenedioxy)-bis(tetrahydropyran-2-methyl acrylate).

References Cited by the Examiner

UNITED STATES PATENTS 2,876,239  3/1959  Montagna et al. _ 260—345.8 XR

OTHER REFERENCES

Parham et al.: Journal American Chemical Society, vol. 70, pp. 4187–4189 (1948).

WALTER A. MODANCE, *Primary Examiner.*

NICHOLAS S. RIZZO, *Examiner.*

N. H. STEPNO, N. S. MILESTONE, *Assistant Examiners.*